United States Patent
Klement et al.

(10) Patent No.: US 7,100,370 B2
(45) Date of Patent: Sep. 5, 2006

(54) METHOD FOR REGULATING THE SPEED OF A DRIVE MOTOR

(75) Inventors: Werner Klement, Heidenheim (DE); Klaus Vogelsang, Crailsheim (DE); Peter Edelmann, Heidenheim (DE); Heinz Höller, Crailsheim (DE); Jürgen Friedrich, Crailsheim (DE); Reinhard Kernchen, Satteldorf (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 526 days.

(21) Appl. No.: 10/111,840

(22) PCT Filed: Aug. 7, 2001

(86) PCT No.: PCT/EP01/09088

§ 371 (c)(1),
(2), (4) Date: Aug. 13, 2002

(87) PCT Pub. No.: WO02/18821

PCT Pub. Date: Mar. 7, 2002

(65) Prior Publication Data
US 2003/0019454 A1    Jan. 30, 2003

(30) Foreign Application Priority Data
Aug. 30, 2000  (DE) ................. 100 42 865
Sep. 20, 2000  (DE) ................. 100 46 834

(51) Int. Cl.
F16D 33/06 (2006.01)

(52) U.S. Cl. ........................................................ 60/357
(58) Field of Classification Search ................. 60/357
See application file for complete search history.

(56) References Cited

U.S. PATENT DOCUMENTS

| 2,643,517 A | * | 6/1953 | Michell ........................ 60/357 |
| 3,055,169 A |   | 9/1962 | Siebold et al. |
| 5,426,939 A |   | 6/1995 | Cottrell |
| 5,853,350 A |   | 12/1998 | Hasegawa et al. |
| 6,357,229 B1 |   | 3/2002 | Schust et al. |

FOREIGN PATENT DOCUMENTS

| DE | 197 06 652 A1 | 7/1998 |
| JP | 03-234969 | 1/1991 |

* cited by examiner

*Primary Examiner*—F. Daniel Lopez
(74) *Attorney, Agent, or Firm*—Baker & Daniels (57) ABSTRACT

The invention involves a process for controlling the rotational speed of a drive motor during a start-up period, in a drive train, containing at least one starter element that can be coupled to the drive motor, in a rotationally fixed manner, in the form of a hydrodynamic coupling, containing a primary blade wheel and a secondary blade wheel, which form together at least one toroid-shaped working space. According to the invention, the rotational speed of the drive motor is set as a function of the power that can be consumed by the hydrodynamic coupling. The consumable power can be controlled or regulated.

18 Claims, 6 Drawing Sheets

METHOD FOR REGULATING THE SPEED OF A DRIVE MOTOR

BACKGROUND OF THE INVENTION

The invention involves a process for controlling the rotational speed of a drive motor.

Processes for controlling the rotational speed of a drive motor, in particular, during the start up period, in a drive train, in particular for use in motor vehicles, including at least one drive motor and a start up element that can be coupled with it, at least indirectly, are known in a multitude of different embodiments with regard to the variables triggering the controlling operation, i.e. the input variables of the control device, the dependence of the control variables on other variables and the correcting variables. It is generally known that, in drive trains of motor vehicles, including an internal combustion engine, especially Otto or diesel engines, and a start up element that can be mechanically or hydrodynamically coupled to them, as a correcting variable for the rotational speed control of the drive motor, a variable is formed that at least indirectly characterizes the adjustment of the power output stage of the drive motor—throttle valve or injection nozzle—and the adjustment device—throttle valve or injection nozzle—is triggered in this way. Reference is made to, as a representative example, "Diesel injection technology" by Bosch, VDI-Publishers 1993, pages 162-on. Start up period is understood here to be the time span of the operating period of the drive train, which is characterized by a run-up of the drive unit from the start, i.e. the start up of the drive motor until the change into a higher gear level in bypassing the hydrodynamic starter element.

When hydrodynamic couplings are used as a start up element in motor vehicles, they are designed in such a manner that a filling of the hydrodynamic coupling can occur automatically during the start up period, for example, depending on the rotational speed of the drive motor or retarded from it. However, it has been shown that dynamic systems behavior becoming set in this way, characterized by the characteristic line of the coupling, is characterized in that high torque can only be transferred at high rotational speeds of the drive motor. This means, however, for embodiment of the drive motor as an internal combustion engine, that the consumption-optimized range in the performance characteristics of the motor, and thus an operating method that is low in hazardous materials, is not achieved and furthermore, for the transfer of high torque a correspondingly high power drive motor is always necessary.

SUMMARY OF THE INVENTION

The purpose of the invention is thus to develop a process for controlling the rotational speed of a drive motor in such a way that the disadvantages mentioned are prevented and if necessary, the consumption-optimized ranges, especially in the use of drive motors in the form of internal combustion engines, optimal from the standpoint of the energy content, can be reached in the performance characteristics of the drive motor during the start up period. The solution according to the invention is characterized by a low control-technical and regulation-technical requirement, as well as a low manufacturing expense.

A process for the rotational speed control of a drive motor in a drive train, containing at least one start up element that can be connected to the drive motor in a rotationally fixed manner in the form of a hydrodynamic coupling, is characterized according to the invention in that the rotational speed of the drive motor is adjusted depending on the power that can be consumed by the hydrodynamic coupling as a function of the rotational speed and torque. This means that upon the appearance of a regulation deviation between a variable that at least indirectly characterizes the rotational speed of the drive motor and an actual value thereof a change of the rotational speed of the drive motor is achieved by a) control and/or b) regulation of the power consumption, especially the torque consumption at a specific rotational speed of the hydrodynamic coupling.

The "variable that at least indirectly characterizes the rotational speed of the drive motor" is in the process understood to be either a variable that is in a proportionality ratio to the rotational speed of the drive motor, so that on this variable the rotational speed of the drive motor can be determined by calculation or derivation or the rotational speed of the drive motor is determined directly.

The solution according to the invention offers the advantage that in addition to an open controllability of energy-optimized and consumption-optimized operating points in the performance characteristics of the drive motor in the embodiment of the drive motor as an internal combustion engine, a transfer of high torques is readily possible at low rotational speeds and the power of the drive motor that is to be provided, that is necessary for this and that can be transmitted, can be kept low.

In an additional embodiment of the invention, the control and/or regulation of the power consumption of the hydrodynamic coupling is done via the control and/or regulation of the filling ratio of the hydrodynamic coupling. In this process, a control is desired in the simplest case. The filling ratio control is done in the process preferably via the application of an influential pressure onto a static medium, in particular, the operating medium level that becomes set in an operating medium storage device in the context of an operating medium supply device. In this process, a portion of the operating medium located in the working space is conducted during the operation of the hydrodynamic coupling in a closed circulation system between at least one outlet from the toroid-shaped working space between the pump wheel and the turbine wheel and at least one intake into the toroid-shaped working space, whereby the intake is coupled to a closed operating medium storage unit that is closed off from the environment in a pressure-tight manner. Upon the appearance of a regulation deviation, a controlling variable is then created in order to generate an influential pressure on the static medium in the operating medium storage unit and the controlling device is regulated. The filling or emptying is then done until the setting of a pressure scale between the operating medium level in the operating medium storage device and the rotating closed circulation cycle.

In an additional embodiment of the invention, additional functions can be realized with the open controllability of individual points in the performance characteristics of the drive motor by the control of the filling ratio, if necessary, also taking into account additional parameters. Included in this are:

a) the creation of a complete separation between the motor and operating machine;

b) the creation of a rigid connection between the motor and operating machine;

c) the function of vibration damping via adjustment of the slip.

Preferably, the option of the rotational speed regulation is provided during the entire start-up period in a drive train, i.e. the time duration of the operation of the hydrodynamic coupling.

In a further embodiment, the process according to the invention is a component of the controlled system of a control for the power output of the drive motor. This offers the advantage of simple realization of an outside control of the power requirement of the drive motor without direct influence of the drive motor, in particular, without required control of the power output stage, which leads to a reduction of the control-technical and regulation-technical expense.

In an advantageous embodiment based on this further development, this process forms a portion of the control system for the adjustment of a constant and temporally independent holding moment for the holding function of a machine. By this special control function, the conventional brake devices, for example, in keeping a vehicle on a slope, can be relieved.

Another possibility consists in integrating the rotational speed regulation of the drive motor in a control for adjustment of a constant, neither time-dependent nor motor rotational speed-dependent output speed, i.e. rotational speed on the main drive pinion, for example, of a machine.

An essential advantage of this process consists, furthermore, in that in order to create the individual control and regulation functions, only at least the following variables must be taken into account for the control operation:

the current actual rotational speed of the drive motor;
the current actual rotational speed on the main drive pinion of the hydraulic coupling
the rotational direction of the main drive pinion;
a variable characterizing, at least indirectly, a desired rotational speed of the drive motor that is to be set, and
optionally, internal state variables for describing the functional method of individual components of the drive train.

The expense for the preparation of corresponding detection devices can thus also be kept low and/or is limited to the detection devices already existing in the drive train.

The solution according to the invention for the rotational speed control, in particular, the setting of the rotational speed of the drive motor as a function of the filling ratio, is not limited to a concrete embodiment of the drive train with hydrodynamic coupling as the starter element. In this way, the drive motors can be designed in the form of internal combustion engines or electro-motors. Usage can be done in stationary systems or mobile devices, preferably in the motor vehicle.

BRIEF DESCRIPTION OF THE DRAWINGS

The solution according to the invention is explained in the following using the drawings. The following are shown in detail in them.

DETAILED DESCRIPTION

Figure 1A:
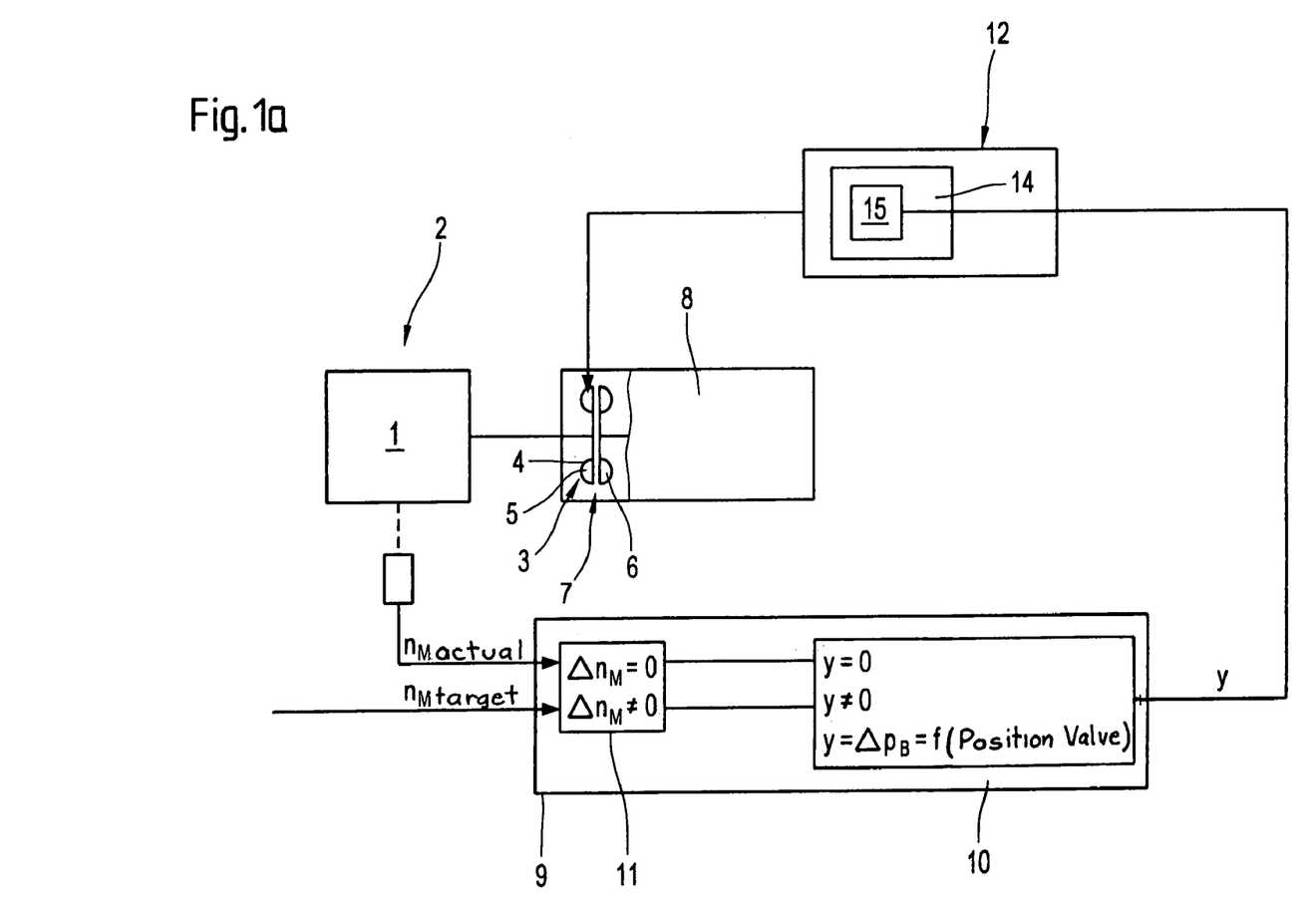
FIGS. 1a and 1b show in a schematically simplified representation using block switching diagrams and signal flow diagrams, the fundamental principle of a process according to the invention for regulating the rotational speed and the design of the control device.

FIG. 1a shows in a schematically simplified diagram using a block switching diagram, the fundamental principle of a process according to the invention for controlling the rotational speed of a drive motor 1 in a drive train 2 during the start up period. The drive train 2 includes in the process at least one start up element 3 that can be coupled at least indirectly to the drive motor 1 and that is designed as a hydrodynamic coupling 4, including at least one primary blade wheel 5 functioning as a pump wheel and a secondary blade wheel 6 functioning as a turbine wheel, which form with each other at least one toroid-shaped working space 7. The drive motor 1 is preferably designed as an internal combustion engine in motor vehicles in the preferred usage of the process according to the invention. However, embodiments as electric motors are also conceivable. The starter element is preferably integrated in a gear structural unit 8.

According to the invention, the rotational speed control of the drive motor 1 is done as a function of the motor torque M as a function of the possible consumable torque $M_{cons}$ by the hydrodynamic coupling 4. In other words, the level of the power $P_{cons}$ that can be consumed by the hydrodynamic coupling 4, in particular, the level of the consumable torque, which essentially corresponds to the power $P_{transM}$ that can be transmitted by the drive motor 1, or this power reduced by the required power for the drive of the additional assemblies or side-assemblies, thus determines the transmittable torque M, based on the characteristic relation, allocated to a certain filling ratio FG of the coupling, between the rotational speed ratio $n_T/n_p$ that becomes set, of the individual blade wheels of the hydrodynamic coupling and the performance number. Via the consumable power, the rotational speed of the pump wheel np is produced and thus the rotational speed $n_M$ of the drive motor 1 corresponding to it, or at least proportional to it.

Figure 1B:
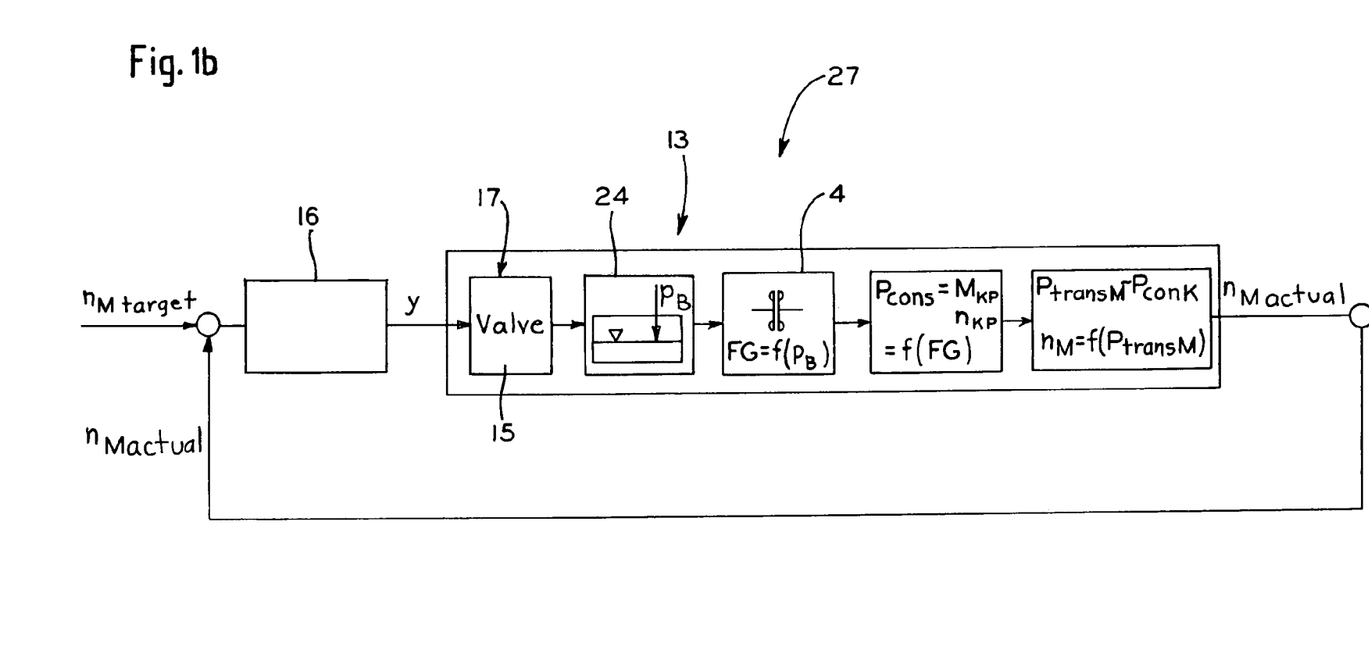
Figure 1C:
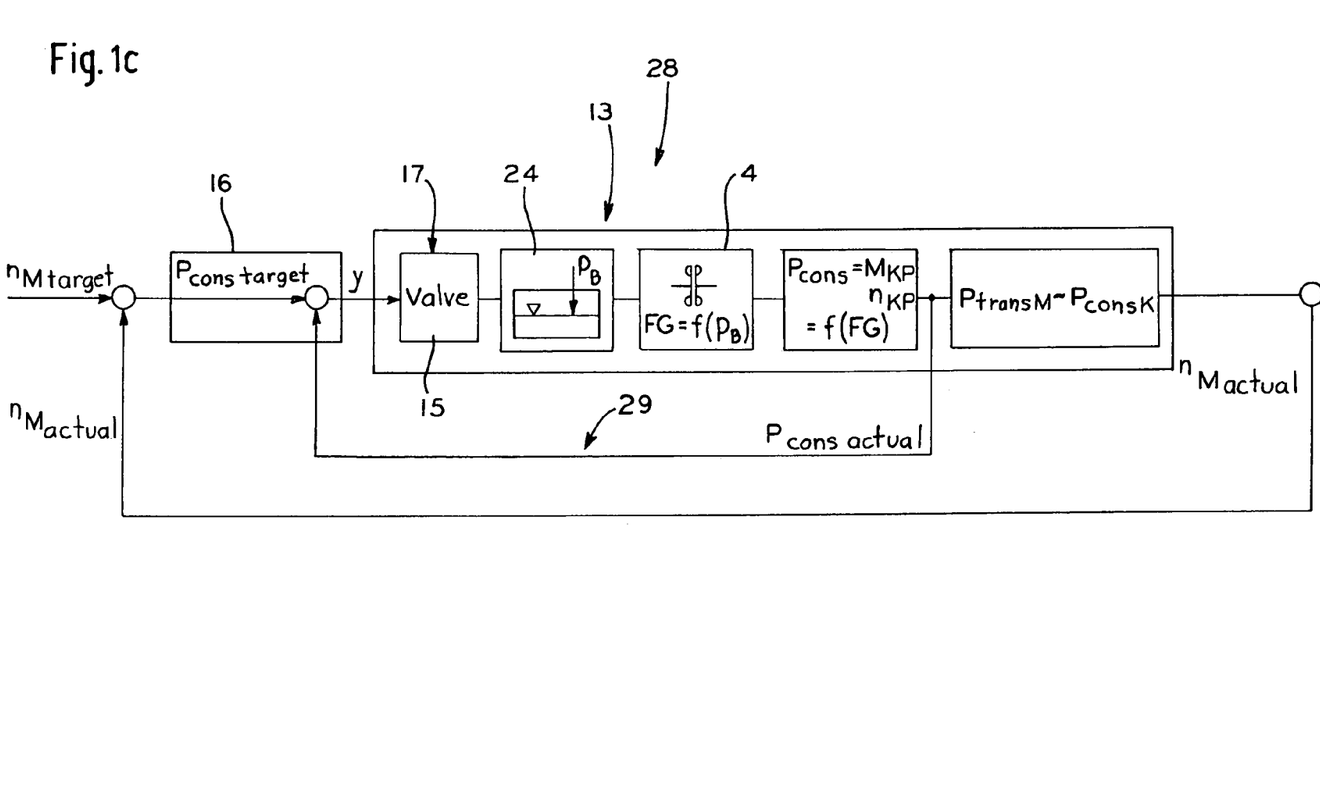
FIG. 1c shows, using a signal flow diagram, a process for the rotational speed control of the drive motor with integrated control of the power that can be consumed by the hydrodynamic coupling.

The regulation of a certain rotational speed $n_{M\ target}$ of the drive motor 1, depending on the power $P_{cons}$ that can be consumed by the hydrodynamic coupling 4, is done by the control or preferably regulation of the power consumption of the hydrodynamic coupling 4, according to FIG. 1a and the signal flow diagram corresponding to FIG. 1b, i.e. regulation of the consumable power $P_{cons}$, as shown using a signal flow diagram in FIG. 1c.

The variable of the consumable power $P_{cons}$ is a function of the filling ratio FG of the hydrodynamic coupling 4. Thus, the filling ratio FG is controlled.

According to the device, the drive motor 1 has assigned to it, for this purpose, a control and regulation device 9, including at least one control and/or regulation device 10, which has at least one comparison device 11, in which at least one target value for a variable that at least indirectly describes the rotational speed $n_M$ of the drive motor, preferably the rotational speed $n_{M\ target}$, is compared with an actual value of a variable that characterizes the rotational speed of the drive motor at least indirectly, preferably the actual rotational speed $n_{M\ actual}$. From the regulation deviation $\Delta n_M$ between the target-rotational speed $n_{M\ target}$ and the actual rotational speed $n_{M\ actual}$ of the drive motor 1, a correcting variable is formed for the control of the power $P_{cons}$ that can be consumed by the hydrodynamic coupling 4, in particular, by the primary blade wheel 5. For the desired control, shown in FIG. 1c, of the power $P_{cons}$ that can be consumed, the target variable $P_{cons\ target}$ is formed from the correcting variable and compared continuously with the current actual variable $P_{cons\ actual}$. The detection of the actual value of the consumable power $P_{cons\ actual}$ is done in the process in the simplest case by detection of the variables that at least indirectly describe the power, moment m actual, and rotational speed m actual, for which purpose, the corresponding detection devices would be provided. The regulation deviation $\Delta P_{cons}$ then leads to a corresponding change of the correcting variable y. For the correcting variable y to take effect, a device for changing and/or influencing 12 the power consumption is assigned to the hydrodynamic coupling 4. This is integrated in the control system 13 of the rotational speed control in regard to the active path. The device for changing and/or influencing 12 the power consumption includes in the process mechanisms 14 for changing the filling ratio during the start-up period. In the process, the filling ratio change is preferably done by filling control through the application of an outside pressure onto a static medium in order to generate a pressure scale between a closed rotating circulation system and the static medium. The closed rotating circulation system is pressure-impermeable, i.e. the inflow and outflow spaces out of the working space of the hydrodynamic coupling and the line connection between them are constructed so that they are impermeable to pressure medium. This pressure, which is also called an influential pressure $p_B$, is generated, for example, using a pressure regulation valve 15, which is a component of the mechanism 14 for changing the filling ratio.

Figure 2:
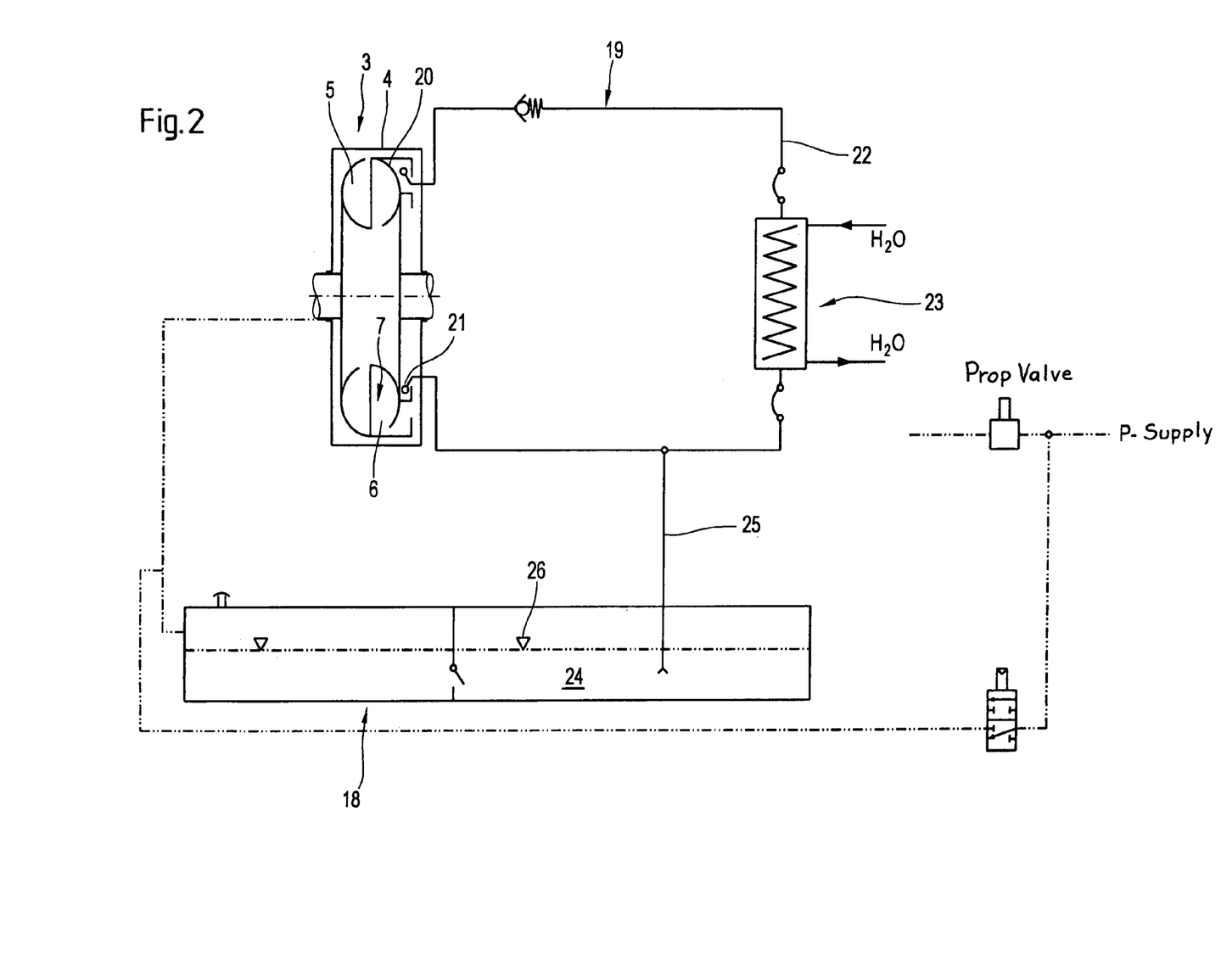
FIG. 2 shows, using a schematic diagram of a hydrodynamic coupling and the operating medium supply system allocated to it, the fundamental principle of the filling ratio control.

The principle of the application of an outside pressure onto a static medium is shown in detail in FIG. 2 using a schematic diagram of a hydrodynamic coupling 4 and the operating agent supply system 18 that is assigned to it. In the process, a portion of the operating medium present in the hydrodynamic coupling in the toroid-shaped working space 5 circulates in a closed circulation system 19. The closed circulation system 19 is designed in the process as a cooling medium circulation system, i.e. during the operation of the hydrodynamic coupling 4, operating medium is conducted in specific quantities out of the working space 7, especially from the outlet 20 out of the working space 7, and via at least one intake 21 into the working space 7. For this purpose, a conducting system 22 is provided. In this system, mechanisms 23 are arranged for the discharge of heat, for example, in the form of a heat exchanger. The conducting of the operating medium out of the working space 7 and into the working space 7 in the closed circulation system 19 functions, in the process, mainly for the cooling of the operating medium, in particular in order to create a continuous cooling operating medium flow. The operating medium supply system 18 contains an operating medium storage device 24 that is designed so that it is pressure-impermeable, for example, in the form of a operating medium pan in a container or tank, which can be coupled via at least one connection channel 25 to the closed circulation system 19 in the area of the intake 21. The operating medium storage device 24 is thus arranged in such a way that the operating medium level 26 that becomes set is preferably arranged beneath the toroid-shaped working space 7. Onto the operating medium level 25, an influential pressure $p_B$ is applied in order to change the filling ratio FG, whereby in acting on the closed tank, it lets operating medium into the working circulation system in the toroid-shaped working space via the connection channel 25 until the pressure forms a pressure equilibrium in the area of the intake 21 after the heat exchanger.

FIG. 1b shows, using a signal flow diagram, the interaction of the individual elements in the overall active path 27 of the rotational speed control during the control of the consumable power $P_{cons}$. The control device 16 corresponds functionally to the control and regulation device 10. The control system 13 forms in the process that part of the active path, which represents the area of the drive train 2 to be influenced. Via the control device 16, the influence of the control system 13 is caused via an acuator 17, which is formed from the pressure regulation valve 15. The operating medium storage device 24, designed so that it is pressure-impermeable, and the hydrodynamic coupling 4, function as additional conduction elements. The power $P_{cons}$ that can be consumed by the hydrodynamic coupling 4 as a function of the filling ratio FG thus corresponds to a specific moment $M_{KP}$ and a specific rotational speed $n_{KP}$, from which the power $P_{trans\ M}$ that can be transmitted by the drive motor 1 can be determined and thus, as a function of the moment assigned to the filling ratio FG, the rotational speed $n_M$ of the drive motor 1 can be determined.

FIG. 1c shows, using a signal flow diagram, the interaction of the individual elements in the overall active path of the rotational speed control 28 during the control of the consumable power $P_{cons}$. The active path for the control of the consumable power $P_{cons}$ is indicated here by 29. Moreover, the control system 13 corresponds to the one described in FIG. 1b, and for this reason, the same reference numbers are used for the same elements.

The solution according to the invention makes it possible to adjust the rotational speed $n_M$ of a drive motor 1 in such a way that an optimal behavior of the drive motor can be achieved in regard to the start-up period. In the process, each individual operating point can be started up separately or stationarily, i.e. set, in the performance characteristics of the drive motor 1. This is done depending on the control or regulation of the power that can be consumed by the hydrodynamic coupling.

Figure 3:
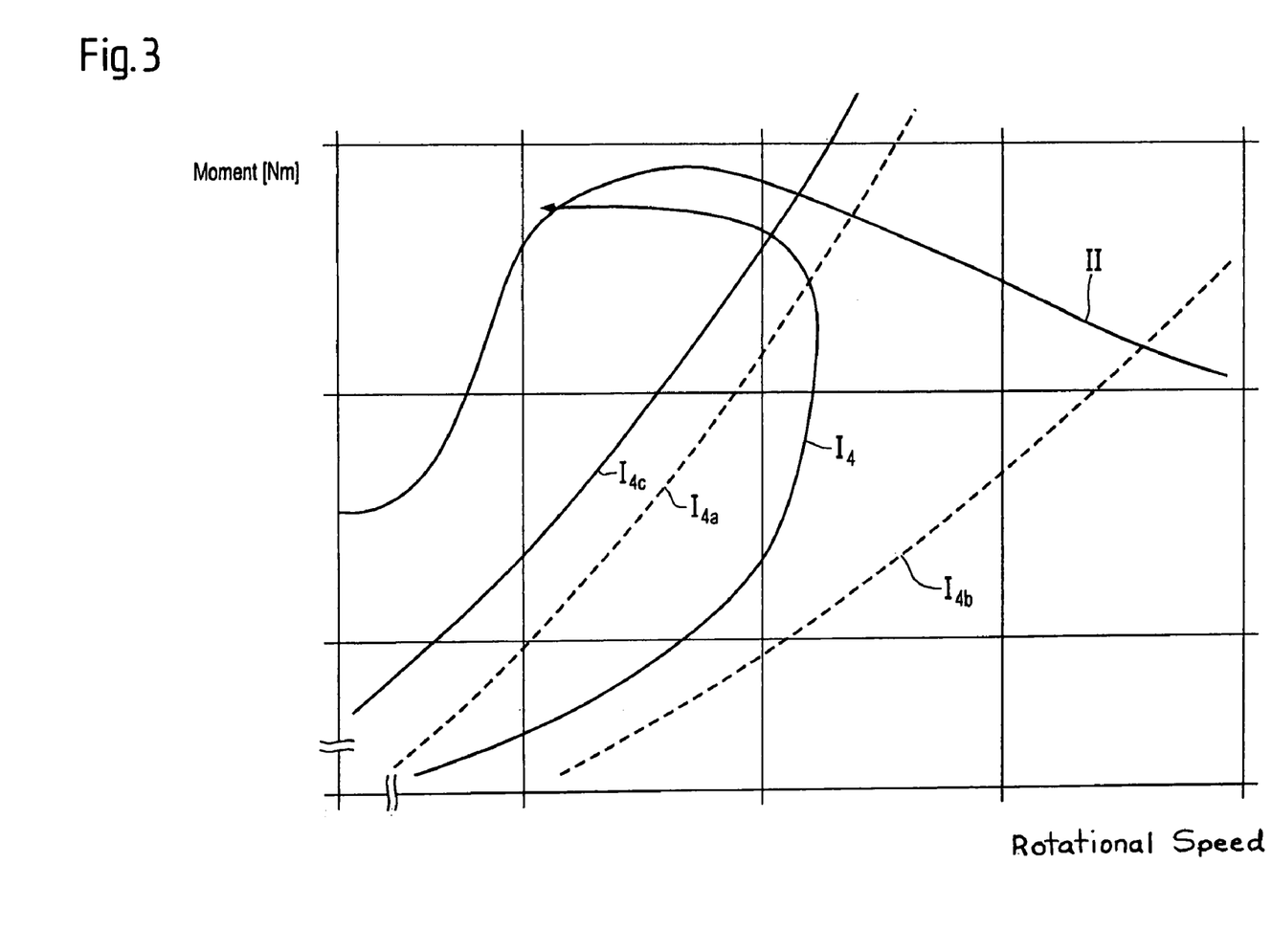
FIG. 3 shows, using the rotational speed/torque performance characteristics of a drive motor, a comparison of the characteristic line of the hydrodynamic coupling with conventionally operated starter elements.

A significant criterion for the rotational speed regulation is formed in the process by the no-load run-up of a drive motor 1, in particular, the emission-optimized operation in embodiments for use in motor vehicles, when developed in the form of an internal combustion engine. Since the power consumption of the starter element, in particular, of the hydrodynamic coupling, is dependent on itself and not on a machine that is connected to it at least indirectly on the main drive pinion side, it is to be taken into account during the installation of an element of this type between the drive motor 1 and the main drive pinion, that for each load condition, between the drive motor 1 and the hydrodynamic coupling, there must also be an equilibrium state with regard to the torque and the rotational speed. The power that can be transmitted by the drive motor is, in the rarest case, fully available, during the start up period, to the gear structural unit (transmission) arranged after the starter element, and thus to the hydrodynamic structural element. The power for auxiliary machines, such as fans, light machines, pumps, etc., which are arranged prior to the starter element, must in the process be drawn from the drive output that is available. During the start up period at low rotational speeds, it is thus necessary in order to operate the drive motor as much as possible in the consumption-optimized range, to transmit as large a moment as possible even at very low rotational speeds. A process of this type can be obtained by a targeted filling ratio change. The power that can be consumed via the hydrodynamic coupling causes, in the process, a change of the rotational speed of the drive motor 1. FIG. 3 shows the possible start up characteristic lines, set opposite each other, of different starter elements 4a–4c, and a hydraulic-coupling 4 that is controlled or regulated according to the invention during the start up period with regard to the possible power consumption, in the rotational speed/torque performance characteristics of the drive motor 1. The moment line of the drive motor is indicated by II. The indicators named in the following are assigned to the individual start up characteristic lines:

1. Trilok-transformer —$I_{4a}$
2. Trilok-transformer with bypass —$I_{4b}$
3. Hydrodynamic coupling with bypass —$I_4$
4. Hydrodynamic coupling controlled according to the invention —$I_4$ From the characteristic lines it can be seen that with the solution according to the invention, a controlled and no-load run-up of the drive motor 1 and an operation in the emission-optimized range of the drive motor, especially of the internal combustion engine, is possible. Furthermore, the transmittability of high moments is increasingly shifted towards low rotational speeds of the drive motor.

Figure 4:
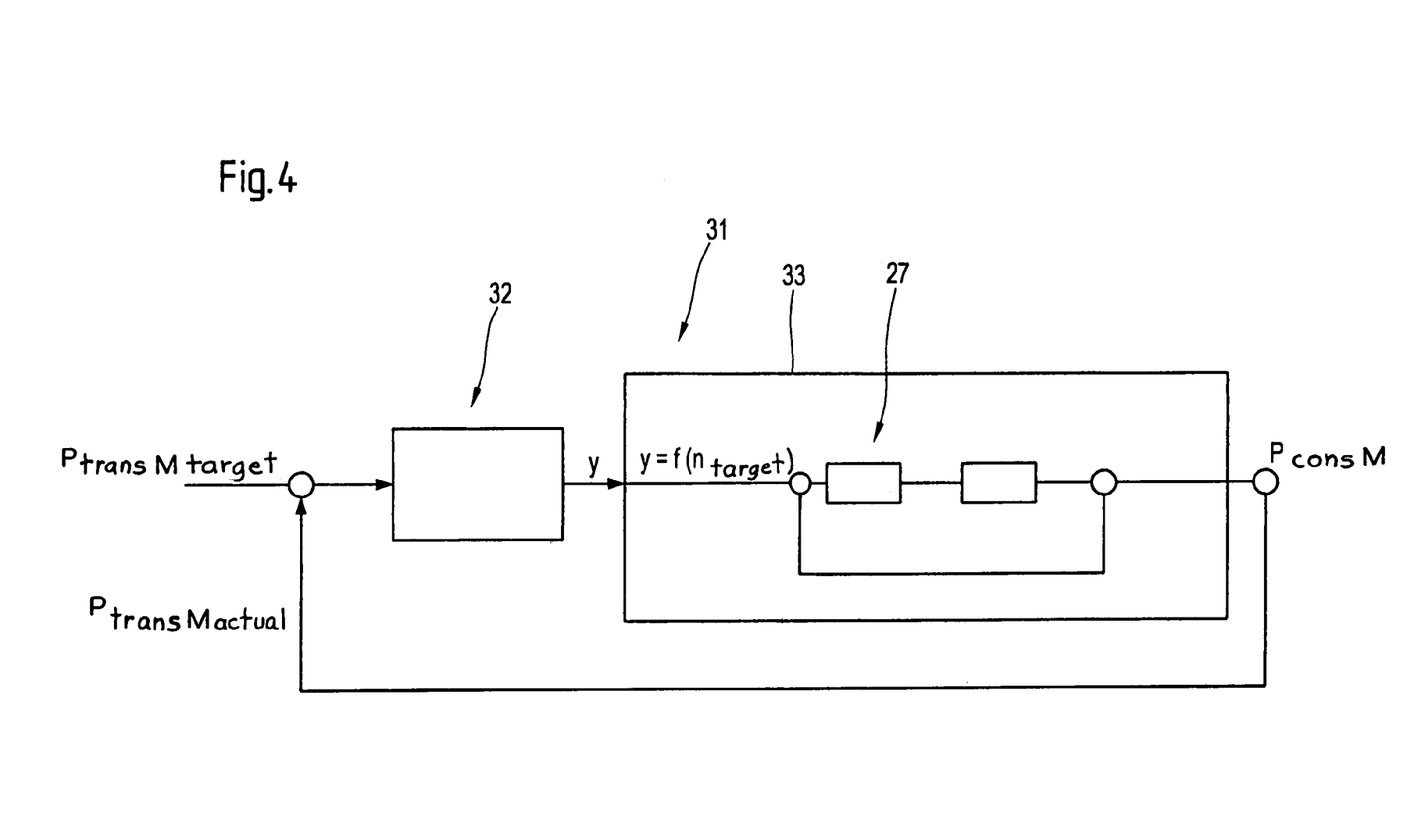
FIG. 4 shows, using a signal flow diagram, the possibility of controlling the power output of the drive motor.

In another embodiment of the invention shown in FIG. 4, the rotational speed regulation of the drive motor is integrated in a control 31 of the power output of the drive motor 1 without direct influence of the main drive pinion. This embodiment includes a control device 32 for comparison of a target value for the transmittable power $P_{trans}\,M_{target}$ to an actual value $P_{trans\,M\,actual}$. The transmittable power $P_{transM}$ is determined in the process, among other things, by the rotational speed $n_M$. The regulation of the rotational speed is done here, with regard to the observational method, in terms of effect in the context of the controlled system 33 of the control 31.

The open controllability of the filling ratio of the hydrodynamic coupling makes possible, furthermore, for corresponding control specification, the setting of a constant, time-independent, load-dependent holding moment for holding functions, for example, when used in motor vehicles, for keeping a motor vehicle on a slope.

REFERENCE INDICATOR LIST

1 Drive motor
2 Drive train
3 Starter unit
4 Hydrodynamic coupling
5 Primary blade wheel
6 Secondary blade wheel
7 Toroid-shaped working space
8 Gear structural unit (transmission)
9 Control and Regulation device
10 Control and Regulation device
11 Comparison device
12 Device for changing and influencing the consumable power
13 Control system
14 Mechanism for filling ratio change
15 Pressure regulation valve
16 Control device
17 Actuator
18 Operating medium supply system
19 Closed circulation system
20 Outlet
21 Intake
22 Conduit system
23 Mechanism for discharge of heat
24 Operating medium storage tank
25 Connection channel
26 Operating medium level
27 Total active path
28 Total active path
29 Active path
30 Control
31 Control of the power that can be transmitted by the drive motor
32 Control device
33 Controlled system
$n_{Mtarget}$ Target rotational speed
$n_{Mactual}$ Actual rotational speed
$P_{cons}$ Consumable power
$P_{cons\,actual}$ Actual value of the consumable power
$P_{cons\,target}$ Target value of the consumable power
$\Delta P_{cons}$ Power deviation
$P_{trans\,actual}$ Actual value of the transmittable power of the drive motor
$P_{trans\,target}$ Target value of the transmittable power of the drive motor
$P_B$ Influential pressure
Y Correcting variable

The invention claimed is:

1. A method for controlling the speed of a drive motor during a start up period in a drive train including a hydrodynamic coupling comprising a primary blade wheel rotatably fixed to the drive motor and a secondary blade wheel forming with the primary wheel a toroidal working space having operating medium therein, said method comprising:
upon the occurrence of a regulation deviation between a target speed value that at least indirectly characterizes the desired rotational speed of the drive motor and an actual speed value that at least indirectly characterizes the actual rotational speed of the drive motor, a correcting variable is produced that changes the power transmission of the hydrodynamic coupling by changing the filling ratio of the hydrodynamic coupling which changes the rotational speed of the drive motor;
said method being used in a control system for holding torque constant during a portion of the start up period.

2. The method of claim 1 and including:
conducting the operating medium in a closed circulation system between an outlet from the toroidal working space and an inlet to the working space wherein the inlet is connected to an operating medium storage unit closed off from the environment in a pressure-tight manner; and
upon the occurrence of the regulation deviation, the correcting variable changes pressure on the operating medium in the storage unit.

3. The method of claim 2 wherein the drive motor speed is controlled during the entire start up period.

4. The method of claim 1 wherein the drive motor is an internal combustion engine.

5. The method of claim 1 wherein the drive motor is an electromotor.

6. The method of claim 1 used in a motor vehicle.

7. A method for controlling the speed of a drive motor during a start up period in a drive train including a hydrodynamic coupling comprising a primary blade wheel rotatably fixed to the drive motor and a secondary blade wheel forming with the primary wheel a toroidal working space having operating medium therein, said method comprising:

upon the occurrence of a regulation deviation between a target speed value that at least indirectly characterizes the desired rotational speed of the drive motor and an actual speed value that at least indirectly characterizes the actual rotational speed of the drive motor, a correcting variable is produced that changes the power transmission of the hydrodynamic coupling by changing the filling ratio of the hydrodynamic coupling which changes the rotational speed of the drive motor;

said method being used in a closed loop control system for setting a constant output speed of the hydrodynamic-coupling during a portion of the start up period which is not engine speed dependent.

8. The method of claim 7 wherein the drive motor speed is controlled during the entire start up period.

9. The method of claim 7 and including:

conducting the operating medium in a closed circulation system between an outlet from the toroidal working space and an inlet to the working space wherein the inlet is connected to an operating medium storage unit closed off from the environment in a pressure-tight manner; and upon the occurrence of the regulation deviation, the correcting variable changes pressure on the operating medium in the storage unit.

10. The method of claim 7 wherein the drive motor is an internal combustion engine.

11. The method of claim 7 wherein the drive motor is an electromotor.

12. The method of claim 7 used in a motor vehicle.

13. A method for controlling the speed of a drive motor during a start up period in a drive train including a hydrodynamic coupling comprising a primary blade wheel rotatably fixed to the drive motor and a secondary blade wheel forming with the primary wheel a toroidal working space having operating medium therein, said method comprising:

upon the occurrence of a regulation deviation between a target speed value that at least indirectly characterizes the desired rotational speed of the drive motor and an actual speed value that at least indirectly characterizes the actual rotational speed of the drive motor, a correcting variable is produced that changes the power transmission of the hydrodynamic coupling by changing the filling ratio of the hydrodynamic coupling which changes the rotational speed of the drive motor;

wherein at least the following variables are taken into consideration for the control method;

the current actual rotation speed of the drive motor;

the current actual rotational output speed of the hydraulic-coupling;

the rotational direction of the hydrodynamic-coupling output; and a variable that at least indirectly characterizes a desired rotational speed of the drive motor that is to be set.

14. The method of claim 13 wherein the drive motor is an internal combustion engine.

15. The method of claim 13 wherein the drive motor is an electromotor.

16. The method of claim 13 used in a motor vehicle.

17. The method of claim 13 wherein the drive motor speed is controlled during the entire start up period.

18. The method of claim 13 and including:

conducting the operating medium in a closed circulation system between an outlet from the toroidal working space and an inlet to the working space wherein the inlet is connected to an operating medium storage unit closed off from the environment in a pressure-tight manner; and upon the occurrence of the regulation deviation, the correcting variable changes pressure on the operating medium in the storage unit.

* * * * *